United States Patent Office 3,534,476
Patented Oct. 20, 1970

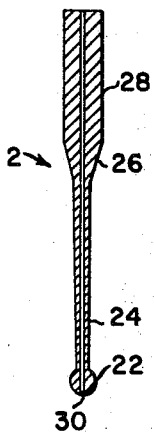
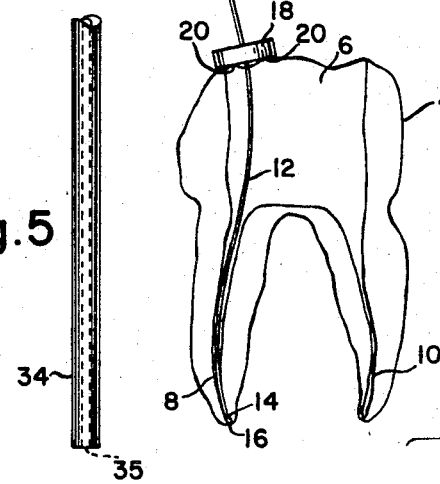
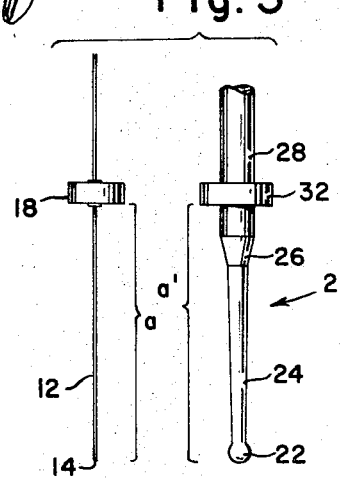
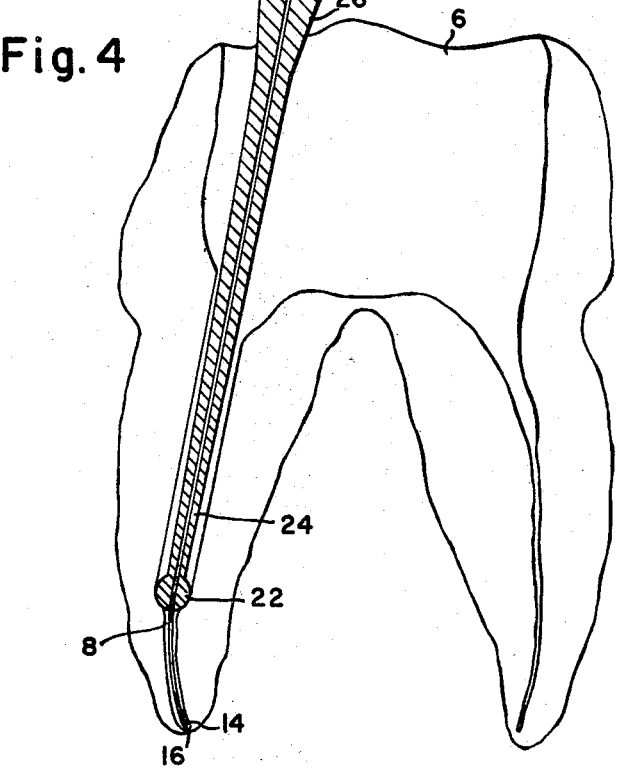
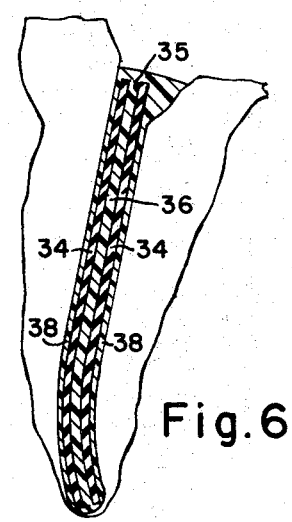
Fig. 1  Fig. 5  Fig. 2  Fig. 3  Fig. 4  Fig. 6
INVENTOR.
Stanley Winters D.D.S.
BY
Curtis, Morris & Safford
ATTORNEYS

3,534,476
METHOD AND APPARATUS FOR DRILLING AND FILLING ROOT CANALS
Stanley J. Winters, 101 W. 57th St.,
New York, N.Y. 10019
Filed July 12, 1968, Ser. No. 744,502
Int. Cl. A61c 3/00
U.S. Cl. 32—40                                   7 Claims

ABSTRACT OF THE DISCLOSURE

The disclosure relates to the manner of drilling and filling root canals in teeth. The drilling is performed by a drill having a central bore. The depth of the root canal is determined, and a stop is placed on the drill to limit the depth of drilling. A flexible rod in the form of a steel wire is then pushed into the root canal with its end seated at the bottom of the canal. The free end of the guide rod is then inserted into the front end of the drill and the drill bur is then moved into the tooth with the guide rod determining the axis of rotation of the drill bur. Hence, the bur follows the exact contour of the root canal and forms a bore of uniform diameter which is free of shoulders or ledges. The bore is then filled by first coating its surface with liquid cement, and then inserting a gutta percha tube toward the bottom of the bore. Air at the bottom of the bore escapes through the center of the tube, and there is also sufficient liquid cement to flow up and fill the center of the tube.

---

This invention relates to dental methods and equipment, and more in particular, to methods and equipment for enlarging and filling the nerve canals in teeth.

When the nerve in a tooth dies, it is frequently possible to avoid the necessity of removing the entire tooth. That involves cleaning the root canals of the tooth by removing all dead tissue, enlarging the root canals and filling them, and fitting an artifiical crown over the top of the tooth. It is essential to the success of this operation that the preparation of each root canal be carried out along its entire length. This is a very difficult operation, because the root canals are frequently very narrow and curved or winding. Conventiona straight drills can be used in a root canal to the point where it makes its first bend. Furthermore, the use of standard drills in enlarging root canals creates the risk that the drill, departing from the path of the canal, will break through the outer wall of the root.

The conventional practice in enlarging root canals is to use a straight drill to the point in the root canal where it is curved so much that the drill can no longer follow it. The dentist then removes the drill and inserts a small, flexible file into the root canal, so that it extends the entire length of the canal. The file is used to enlarge the size of the canal slightly, and may then be replaced by a slightly larger file, which is used in a similar manner. This is continued until the canal has been enlarged to the size necessary for filling and sealing. This procedure is very time consuming, and it requires great skill, particularly when the nerve canal has sharp bends or ledges that tend to catch the files and prevent them from following the canal to the lower end of the root. Furthermore, the larger diameter files do not bend easily, and their tendency to straighten themselves may cause them to grind excessively on the outside wall of the canal at bends. Also, the drill may create a shoulder that will catch the tip of any file subsequently inserted in the canal.

The present invention avoids the difficulties previously encountered by providing a flexible drill that follows the path of the root canal throughout its entire length. The drill is guided along the canal by a small, flexible wire, extending the length of the canal and into an axial opening in the drill.

An object of this invention is to provide means for enlarging the root canals of teeth to a uniform diameter quickly and efficiently.

A further object is to provide means for guiding a drill throughout the entire length of the root canals.

A further object is to provide means for insuring that the drill reaches to but not beyond the lower end of the root canal.

Still further objects are to provide a simplified method of enlarging and filling root canals, and to reduce the difficulty of removing air pockets from the inside of the filling.

These and other objects will be in part obvious and in part pointed out below.

In the drawings:

FIG. 1 is a cross-sectional view of a drill made in accordance with the present invention;

FIG. 2 is a cross-sectional view of a tooth, showing the root canals that are to be enlarged in accordance with the present invention, and showing a flexible guide wire that has been inserted into one of the root canals for the purpose of measuring the length of the canal;

FIG. 3 is a perspective view of the flexible guide wire and the drill of the present invention, positioned parallel to one another to illustrate the positioning of the stop on the drill;

FIG. 4 is a cross-sectional view of a tooth, one of whose root canals is being enlarged by a drill in accordance with the present invention;

FIG. 5 is a perspective view of the gutta percha tube used in filling teeth in accordance with the present invention; and FIG. 6 is a cross-sectional view showing a tooth root in the canal which has been enlarged and filled in accordance with the present invention.

Before the drilling of a root canal in accordance with the present invention is commenced, the length of the root canal must be measured. FIG. 2 shows a tooth 4 that has been prepared for root canal work. An opening 6 in the crown of the tooth provides access to the root canals 8 and 10 that are to be enlarged. For the purpose of measuring one of the canals, a length of thin, flexible metal wire 12 has been inserted in canal 8. Wire 12 has been forced down into the canal until its end 14 is as near as possible to the end 16 of the canal. The dentist inserting wire 12 in the root canal can ascertain the exact location of wire end 14 by X-raying the tooth. In this way, he can be sure that wire 12 extends the entire length of canal 8. The measurement of the length of the canal is recorded by means of a collar 18, which fits snugly around wire 12. Collar 18 can be slid along wire 12, but there is enough friction between them to hold collar 18 at a point on the wire until it is slid manually to another point. When wire 12 has been fully inserted into the root canal, collar 18 is moved down along the wire until it rests against the upper surfaces 20 of tooth 4. Wire 12 is then withdrawn from the tooth, with collar 18 remaining at the same point on the wire as it was when the wire was in the root canal. The distance between the tip 14 of wire 12 and the lower surface of collar 18 (shown as a in FIG. 3) is the same as the distance from the upper surfaces 20 of tooth 4 to the bottom 16 of root canal 8.

Referring to FIGS. 1 and 3, the drill 2 to be used in enlarging the root canal comprises a drill bur 22, a central portion 24, a tapered portion 26, and an enlarged cylindrical portion 28. Drill bur 22 is of approximately the diameter to which root canal 8 is to be enlarged. Central portion 24 is flexible enough to follow any of the curves of a root canal. It is slightly tapered, and its diameter is less than that of bur 22, so that it can move easily through the portion of the canal already drilled. The length of central portion 24 is greater than that of the root canal, so that the bit can reach the bottom of the canal. Drill 2 has an axial bore 30 (see FIG. 1), which is of slightly greater diameter than wire 12 and extends the entire length of the drill, so that the drill can slide upon and be guided by the wire.

Fitted snugly around cylindrical portion 28 of drill 2 is a collar 32. Like collar 18, collar 32 can be slid manually along portion 28, but when it has been positioned it will hold its position until manually relocated. After the depth of the root canal has been measured with wire 12, as previously described, collar 32 (see FIG. 3) is adjusted on the drill so that it is the same distance $a^1$ from the tip of drill bur 22 as the distance labelled $a$ which collar 18 is from the tip 14 of wire 12.

The actual drilling of the root canal proceeds in the following manner: Wire 12 is once again inserted into the root canal until its tip 14 reaches the bottom end 16 of the canal 8. Collar 18 is removed from wire 12, and the free end of wire 12 is inserted or slipped into the axial bore 30 of drill bur 22 (see FIG. 4). The drill may then be operated with wire 12 remaining stationary while the drill rotates about it. Drill 2 is moved manually toward the tooth along wire 12 with drill bur 22 being guided by the wire to top of the root canal. The drill bur follows the wire through the curves in the root canal, and produces a bore of uniform diameter throughout the length of the canal. Also, the bore is free of sharp turns and ledges or shoulders.

When the tip of drill bur 22 reaches the end 16 of the root canal, collar 32 comes to rest against the upper surface 20 of the tooth, just as collar 18 had during the measurement procedure. In this way, collar 32 acts as a stop and prevents the drill from drilling beyond the end of the root canal.

A significant advantage of the method of drilling that has been described is that it produces an enlarged root canal of uniform diameter. This uniformity substantially simplifies the task of filling the canal and reduces the possibility that air pockets will form in the cement adjacent the surface of the tooth. The method of filling root canals in accordance with the present invention is illustrated by FIGS. 5 and 6. When the drilling of of the root canal has been completed, some liquid cement is worked down into it. A gutta percha tube 34 with a center bore 35 and of slightly smaller diameter than the root canal, is then pushed down into the canal. During this procedure, any air within the canal passes up through the center bore of the tube. As the tube reaches the bottom of the root canal, the fluid cement also passes upwardly through bore 35 so as to fill the bore and form a cylindrical core 36. Tube 34 is of the same length as root canal 8 so that it completely fills the canal. It is surrounded by a thin layer or film of cement 38, which fills the entire space between the tube and the canal wall. Hence, the root canal is completely obliterated and is replaced by a cylindrical plug formed by tube 34, cement core 36, and cement layer 38. Even if there is an air bubble in the center of gutta percha tube 34, it will cause no difficulty because it is thoroughly isolated from the tooth. It will be noted that the success of this operation depends upon the uniform diameter of the enlarged root canal, since any irregularity in the canal could produce a pocket which the cement might not fill completely.

In the illustrative embodiment, drill 2 has a flexible shank or central portion 24 which permits the drill bur 22 to follow a curved root canal contour. However, as shown in FIG. 4, the diameter of bore 8 is sufficiently great to permit the drill bur 22 to reach the bottom of the root canal without flexing. The invention also contemplates that a flexible guide rod such as wire 12 may be used with a drill having a rigid shank where circumstances permit. The drill bur rotates with wire 12 acting as a fixed axle or pivot rod with the leading face and cutting edges of the bur forming the bore of uniform diameter and having its axis concentric with the axis of wire 12. That is, the lower end of wire 12 is seated at the bottom end of the root canal and it maintains a relatively fixed contour along the root canal up to the leading face of the drill bur. Upwardly from that leading face wire 12 is enclosed snugly by the axial bore 30 in drill 2.

The flexible characteristic of the shank or central portion of drill 2 may be provided by a mesh or foraminous sleeve or integral structure. With the embodiment illustrated in the drawings the flexibility is a characteristic of the metal.

What is claimed is:

1. In a method for treating root canals in teeth, the steps of, measuring the length of the canal, positioning a flexible guide rod in the canal substantially throughout said longitudinal dimension with the guide rod flexing to follow the longitudinal contour of the canal, utilizing said guide rod as the axis for a drill bur and drilling a bore of substantially uniform diameter throughout said longitudinal dimension with the drill bur being held by said guide rod so that the drilling action is around an axis concentric with the axis of said guide rod.

2. The method as described in claim 1, which includes the subsequent steps of coating the surface of the bore with a flowable cement, and inserting therein a flexible tube member of substantially uniform external diameter which is slightly less than the diameter of said bore and discharging the air and excess cement through the center of said tube.

3. In apparatus for drilling root canals in teeth, the combination of, a flexible guide rod which may be inserted into the canal with its extreme end nested at the bottom of the canal and with the guide rod having the longitudinal contour of the canal, and a drill having a central bore which snugly receives said rod and is slidable thereon, said drill having a drill bur which is adapted to rotate about said guide rod and to produce a bore of uniform diameter having an axis which is substantially concentric with the central axis of the canal.

4. Apparatus as described in claim 3, wherein said guide rode is a flexible wire.

5. Apparatus as described in claim 3, wherein said drill has a flexible shank whereby the bur may be turned by said guide rod to rotate about an axis which is out of alignment with the opposite end portion of said drill.

6. In apparatus for drilling and filling root canals in teeth, the combination of: drilling means comprising a flexible guide rod which may be inserted into the canal with its extreme end nested at the bottom of the canal and with the guide rod having the longitudinal contour of the canal, and a drill having a central bore which receives said rod and is slidable thereon, said drill having a drill bur which is adapted to rotate about said guide rod and to produce a canal bore of uniform diameter having an axis which is substantially concentric with the central axis of the canal; and a flexible tube which may be inserted in the canal bore after cement has been placed therein and while the cement is flowable whereby air and excess cement are discharged from the canal bore through the flexible tube and thereafter the tube and the cement form a composite filling for the canal bore.

7. Apparatus as described in claim 6 wherein said tube is of gutta percha.

References Cited

UNITED STATES PATENTS

| 3,035,351 | 5/1962 | Hirsch | 32—40 |
| 3,358,826 | 12/1967 | Siegel | 32—40 XR |
| 3,388,473 | 6/1968 | Loran | 32—57 |

ROBERT PESHOCK, Primary Examiner

U.S. Cl. X.R.

32—48